(12) United States Patent
Dushane et al.

(10) Patent No.: US 7,454,269 B1
(45) Date of Patent: Nov. 18, 2008

(54) PROGRAMMABLE THERMOSTAT WITH WIRELESS PROGRAMMING MODULE LACKING VISIBLE INDICATORS

(75) Inventors: Steven Dushane, Granada Hills, CA (US); John Staples, Chatsworth, CA (US)

(73) Assignee: Venstar, Inc., Chatsworth, CA (US)

( * ) Notice: Subject to any disclaimer, the term of this patent is extended or adjusted under 35 U.S.C. 154(b) by 0 days.

(21) Appl. No.: 11/809,799

(22) Filed: Jun. 1, 2007

(51) Int. Cl.
*G05B 15/00* (2006.01)
*G05D 23/00* (2006.01)
*F24F 11/00* (2006.01)

(52) U.S. Cl. .............................. 700/276; 700/83; 236/94

(58) Field of Classification Search .................... 700/17, 700/83, 275–278, 299, 300; 236/1 B, 1 C, 236/91 R, 91 D, 94; 715/700, 866, 965, 970
See application file for complete search history.

(56) References Cited

U.S. PATENT DOCUMENTS

| | | | | |
|---|---|---|---|---|
| 4,621,336 A | * | 11/1986 | Brown | 700/728 |
| 6,116,512 A | * | 9/2000 | Dushane et al. | 236/51 |
| 6,196,467 B1 | * | 3/2001 | Dushane et al. | 236/46 R |
| 6,213,404 B1 | * | 4/2001 | Dushane et al. | 236/51 |
| 6,628,997 B1 | * | 9/2003 | Fox et al. | 700/86 |
| 6,680,673 B1 | | 1/2004 | Wong | |
| 6,814,299 B1 | * | 11/2004 | Carey | 236/46 R |
| 6,824,069 B2 | * | 11/2004 | Rosen | 236/94 |
| 6,963,784 B1 | | 11/2005 | Gibbs | |
| 7,028,912 B1 | * | 4/2006 | Rosen | 236/1 C |
| 7,156,318 B1 | * | 1/2007 | Rosen | 236/94 |
| 2005/0194457 A1 | | 9/2005 | Dolan | |
| 2005/0270151 A1 | * | 12/2005 | Winick | 340/539.1 |

* cited by examiner

*Primary Examiner*—M. N. Von Buhr

(57) ABSTRACT

The present invention comprises an intuitive algorithm embodiment. In said intuitive algorithm embodiment, a programmable thermostat that operates under control of a control program incorporating an intuitive algorithm. The intuitive algorithm allows a user to change the modes and setpoints of a programmable thermostat without need to refer to a display of currently effective operational modes, setpoints, or environmental sensor inputs. While a user may prefer to observe said display, the intuitive algorithm eliminates the need to do so.

13 Claims, 6 Drawing Sheets

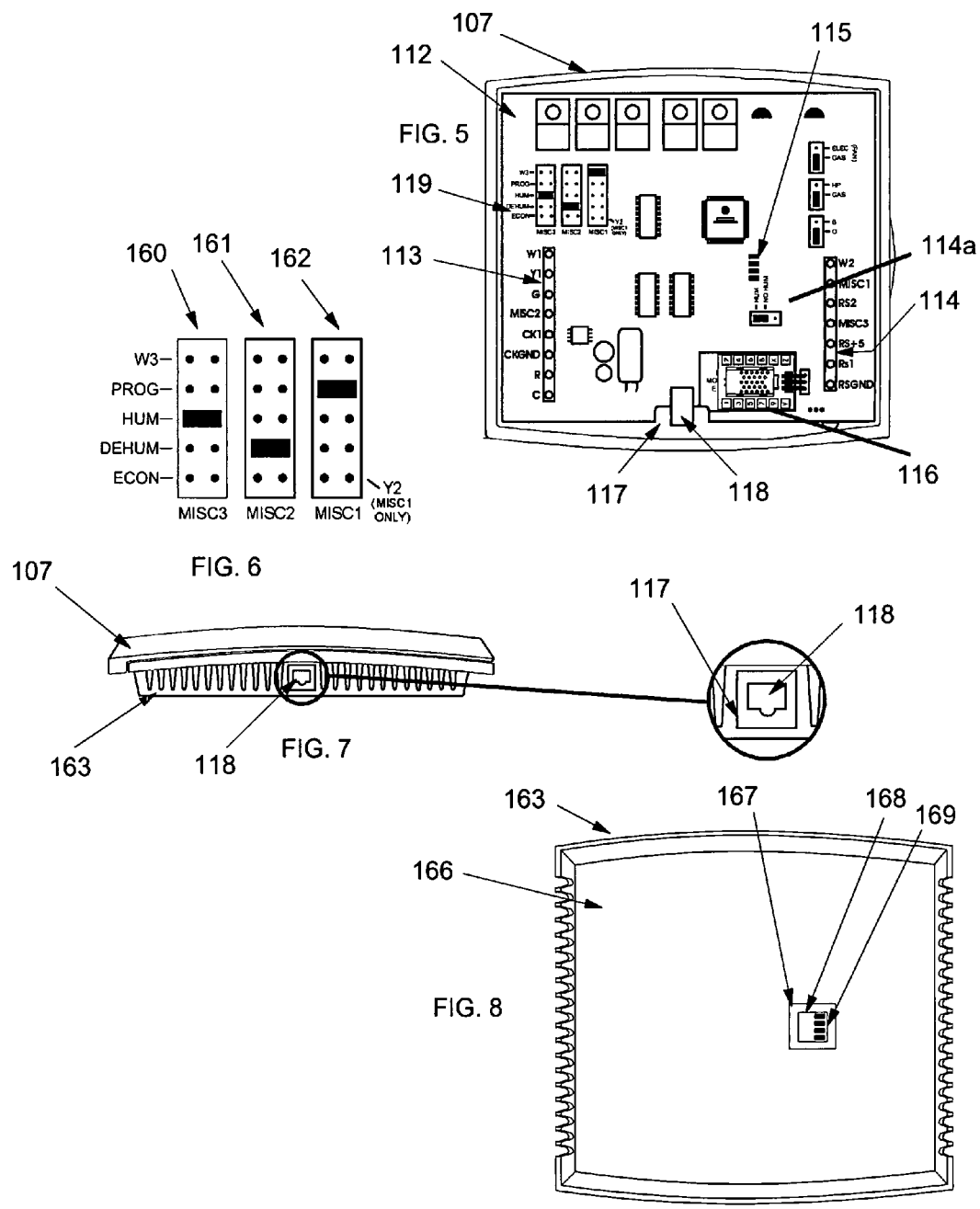

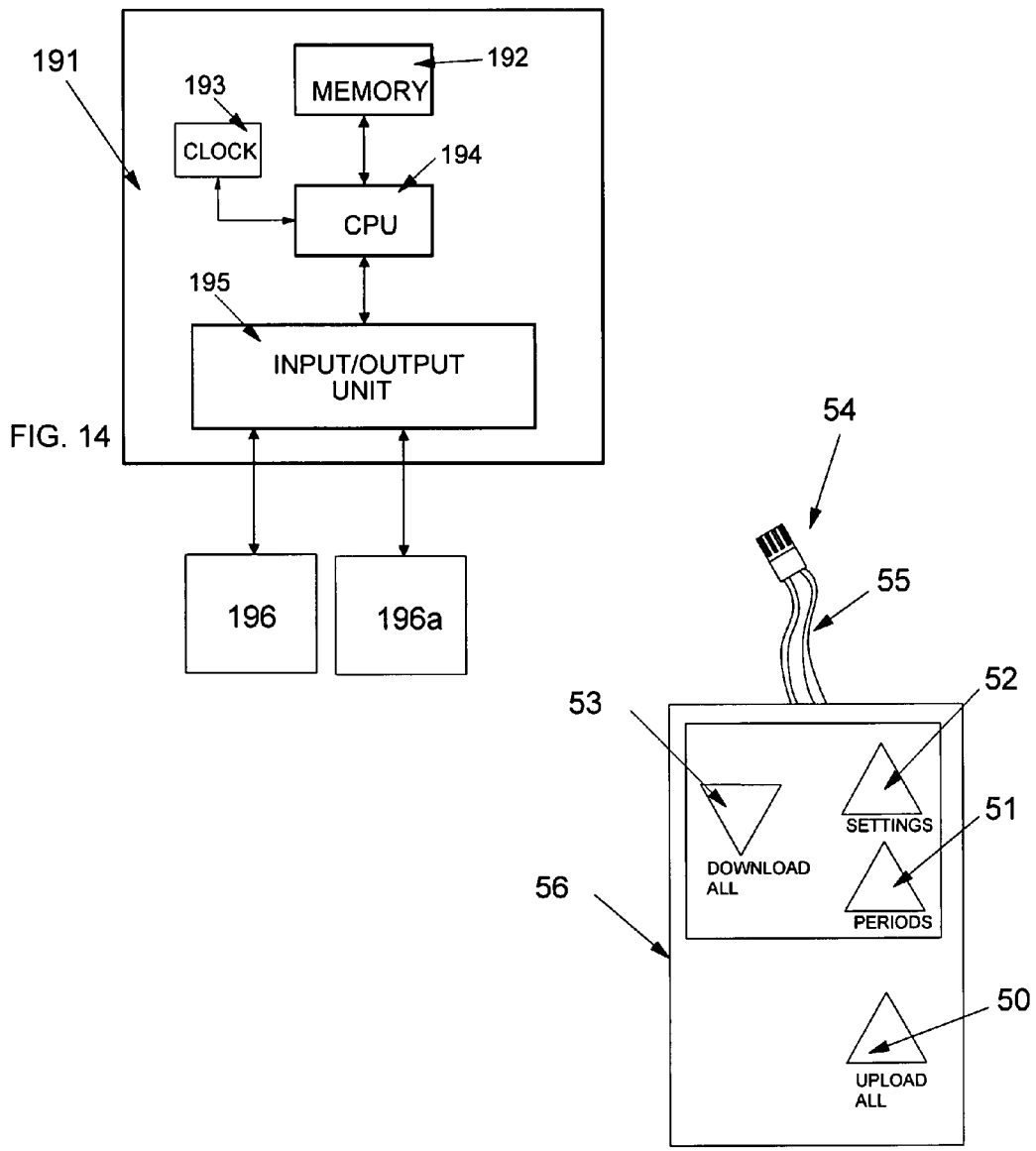

PROGRAMMABLE THERMOSTAT WITH WIRELESS PROGRAMMING MODULE LACKING VISIBLE INDICATORS

FIELD OF THE INVENTION

The present invention relates to a programmable thermostat operating under an algorithm for a local or distant user interface, said algorithm especially relating to circumstances where a user need not view an information display to operate said thermostat.

BACKGROUND

Some current models of programmable thermostats are capable of communicating via wired or wireless connection with a remote user interface. The prior art remote user interface typically duplicates features of a local user interface at the programmable thermostat. Such prior art remote user interfaces have a display that indicate various aspects of the operational modes and setpoints of the programmable thermostat, as well as information from environmental sensors and operational states of environmental control equipment. A user must view and evaluate the displayed information and arrive at a decision concerning changes to modes and setpoints for the programmable thermostat. Because a user will not typically need to change every aspect of the environmental control system that is shown in a user interface display, said display typically contains information that is unnecessary to a user at a specific time when the user wishes to make a change. A user must eventually recall the operation of the user interface to effect a desired change to the environmental control system.

Multiple pressure sensitive buttons are provided at the prior art remote user interface so that a user can make changes in the operational modes or setpoints that control operation of HVAC equipment in the environmental control system. The changes input by the user at the user interface are implemented by a control program of the programmable thermostat and the changes in the environmental control system are subsequently shown in text or iconic forms on a display visible to a user. In the not so distant past, a user could quickly recall the requirements of a user interface to make these changes. The present state of the art in programmable thermostats is very different.

With the availability of low cost microprocessors, computer memory and displays, sophisticated programmable thermostats are currently available for operation of environmental control equipment in residences and commercial buildings. The trend in user interfaces has been to increase their complexity, time required for learning their inputs, outputs and displayed information, and the time required make important changes to operational modes or setpoints. In fact, a user presented with the advanced control features and information displays of a moderately sophisticated programmable thermostat will often spend substantial time trying to remember the meaning of displayed information in text and icons just to make relatively simple desired changes to the operation of the environmental control system. In an effort to improve efficiency and environmental comfort, equipment for environmental control systems has proliferated. Such equipment can include multiple fans, heating stages, cooling stages, duct air flow controllers, and remote sensors providing information for their control. In response, the user interface has become a barrier of sorts to acceptance of advanced features of a programmable thermostat, regardless of their benefits.

There is a need to provide a user with a programmable thermostat capable of being operated with a simple and easily learned algorithm, preferably one which does not require reference to displayed information showing operational modes, setpoints, or environmental conditions of the environmental control system.

SUMMARY OF THE INVENTION

The present invention comprises an intuitive algorithm embodiment. In said intuitive algorithm embodiment, a programmable thermostat that operates under control of a control program incorporating an intuitive algorithm. The intuitive algorithm allows a user to change the modes and setpoints of a programmable thermostat without need to refer to a display of currently effective operational modes, setpoints, or environmental sensor inputs. While a user may prefer to observe said display, the intuitive algorithm eliminates the need to do so.

The intuitive algorithm comprises one or more steps. A first step causes the control program to operate in one of two operational modes and with a first setpoint for the selected mode selected to be a value close to a current ambient condition but far enough from it to cause environmental control equipment to operate. A second and subsequent steps change the first setpoint by pre-set increment to a value farther from the current ambient condition. A final step causes the control program to return the setpoint to equal the value of the ambient condition while maintaining the selected operational mode. An optional re-set step causes the control program to return to a non-operation state or other pre-set state so that the intuitive algorithm is re-initiated.

The intuitive algorithm allows a user to input a "higher" or "lower" signal (a first step) and cause the environmental control system to operate in, albeit at a setpoint operationally closest to an ambient environmental condition. The user can then input subsequent single signal inputs identical to the one in the first step (at a second and subsequent steps) to change the setpoint to a value incrementally farther from the ambient condition. In the final step, the user inputs a single signal different from the one in the first step to return the setpoint to the value of the ambient environmental condition. In a re-set step, a user may exit the intuitive algorithm and return the control program to a pre-selected operation mode.

The present invention also comprises a communication module embodiment comprising an infrared or otherwise wireless communication module that is removable from the programmable thermostat via an externally available port, where the communication module comprises a communication processor and a communication connection with a thermostat processor of the programmable thermostat. The communication module also comprises wireless communications means, such as a transceiver for infrared or other wireless communications. A communications control program operates in the communications module to first receive information from the programmable thermostat and store it in a local memory to determine by comparison which of two or more models of programmable thermostat said module has been connected. The communications control program then determines the capabilities of the model to receive wireless communications and performs a communications function for the programmable thermostat according the capabilities of the model.

The communications module may be purchased separately from said model, thereby reducing the price of said model. The communications module is easily installed and cooperates to receive input from wireless communications devices for input which activates and causes the thermostat control program to operate the above intuitive algorithm.

The present invention also includes a remote communicator embodiment comprising a small, handheld communicator in a housing supporting a transmitter processor, a user interface with two or more pressure sensitive buttons, and a wireless transmitter adapted to communicate with the communications module connected with a programmable thermostat. The user interface comprises at least a button indicating to the user that pressing it will transmit a "higher" signal to the programmable thermostat and another button indicating to the user that pressing it will transmit a "lower" signal to the programmable thermostat. In addition, the user interface also may comprise a button indicating to the user that pressing it will transmit a "re-set" signal to the programmable thermostat. The communicator may lack a display or other means for showing setpoints, modes, or environmental conditions that a user would typically deem necessary to operation of a thermostat in an environmental control system. A user need not see such information. Operating the intuitive algorithm from the communicator without such a display provides the user with equal assurance in operation of the thermostat as with information in the display. In many respects, operating a sophisticated programmable thermostat is easier for a user when their attention is not distracted by display information. In one form of the communicator, the user interface comprises intuitive algorithm buttons for the "higher" signal, "lower" signal and "re-set" signal respectively to buttons labeled "WARMER", "COOLER" and "RESET". In another form the communicator transmitter operates by sending infrared signals and the communicator control program is adapted to operate so that its infrared transmissions are capable of being received by other infrared devices comprising an infrared receiver and a "teach" mode, as are well known in the art of remote television and home entertainment handheld controllers. A controller so "taught" is then capable of operating to transmit a "higher" signal, "lower" signal or "re-set" signal to the programmable thermostat for operation of the intuitive algorithm.

The intuitive algorithm may be operated by voice command so that inputs of human voice to the programmable thermostat cause the thermostat control program to use such input as a "higher" signal, a "lower" signal, or a "re-set" signal under the intuitive algorithm. A programmable thermostat with a local microphone and means for voice recognition may receive a human voice input where the spoken words "WARMER", "COOLER" and "RESET" cause the programmable thermostat to operate as if it had received, respectively, a "higher" signal, a "lower" signal and a "re-set" signal. The programmable thermostat may be equipped with a wired or wireless communication link to the telephone system, Internet, or other means for receiving human voice inputs, whereupon a user may remotely transmit their voice commands to the programmable thermostat and thereby activate and operate the programmable thermostat by way of the intuitive algorithm. Such a wired or wireless communication link may be adapted to receive other transducable signals from a remote location as input to activate and operate the programmable thermostat by way of the intuitive algorithm. The only fairly simple requirement is that the source be capable of transmitting at least two separable and different signals which the thermostat control program receives as input pre-determined to correspond to the "higher" and "lower" signals of the intuitive algorithm.

The present invention also comprises a programming module embodiment comprising a programming module that is connectable and removable from the programmable thermostat, where bi-direction communications are established between the programming module and the programmable thermostat for exchange of setpoints and operation mode information. The complexity of programmable thermostats is well known. Substantial effort is required of a user to recall programming protocols as they relate to a user interface where a user does not often use the interface. Even more effort, with the potential for human error in duplicating setpoints and operating modes, is required of a user where a single facility operates with multiple programmable thermostats. The programming module is a device with a simple user interface that causes the module to download and store all the setpoints and operating mode information from a first programmable thermostat so that this information is available for uploading to a second thermostat with an equally simple user interface. A user can then be assured of possessing a source of instructions for the programmable thermostat which can be copied back to the first thermostat (after changes have been made) or to a second thermostat that is needed to operate as the first thermostat. In one form of the programmable module, factory default information on setpoints and operating modes are optionally available to a user to upload to the programmable thermostat.

The programmable module is removable from the programmable thermostat via an externally available port, where the programmable module comprises a programming processor and a programming connection with a thermostat processor of the programmable thermostat. A programming control program operates in the programming module to first receive information from the programmable thermostat and store it in a local memory to determine by comparison which of two or more models of programmable thermostat said module has been connected. The programming control program then determines the capabilities of the model to receive or download to the programming module setpoints, operating mode information or other such information. The ease with which the user interface allows the user to make these information exchanges is by "one click" of a user interface button for uploading and "one click" of a user interface button for downloading. In another form of the programming module, additional buttons represent uploading of only setpoints via a setpoint button and uploading of only operating mode information via a periods button.

The present invention also comprises a retrofit embodiment of a more basic model of a programmable thermostat to be capable of wireless communications. In one form of this embodiment, a backplate of a housing enclosing the programmable thermostat is removable for access to an underlying set of circuit boards, wire connectors and other devices. The rearward facing surface of the circuit board facing an inside surface of the backplate comprises a set of electrical contacts connected with an input/output unit of the thermostat processor. These contacts are adapted to be connected with mating electrical contacts on a wireless module fixed in an impression formed in the backplate. This retrofit embodiment allows a user to purchase a relatively low cost programmable thermostat and add to it a wireless communication capability just by changing the backplate. The easily removed backplate of the housing of the programmable thermostat makes the process of upgrading the programmable thermostat to bi-direction wireless communication a task even a relatively unskilled person can achieve. In one form of the retrofit embodiment, the wireless module comprises a bi-directional spread spectrum transceiver capable of sending and receiving wireless signals throughout a local area.

The present invention also comprises a configurable output embodiment providing one or more configurable outputs for control of environmental control equipment or other devices. In a preferred form, a circuit board or other internal support surface is accessible to a user. On this surface, two or more paired sets of electrical contacts corresponding to a separate configurable output are presented for easy access by a user. Each of the paired sets of electrical contacts represents instructions in the thermostat control program which causes one of the configurable outputs to respond according pre-programmed steps or programmable steps. Causing one of the paired sets of electrical contacts into a configurable output to be connected (such as by installing a jumper between them) thereby configures the configurable output to operate according to pre-programmed or programmable steps. While programmable thermostats have endeavored to keep pace with the expanding range of equipment which must be controlled in an environmental control system, prior art outputs are used for a single purpose and their output function is not capable of being changed from, say, a cooling stage output to a heating stage output. The configurable output embodiment frees the user to select any type of equipment to be controlled by the programmable thermostat. In a preferred form of this embodiment, one of the paired sets of electrical contacts represents instructions for a programmable output. The equipment connected with this output may be any device that is desired to be controlled by parameters permitted by the thermostat control program. The programmable output device may, in preferred forms of the embodiment, be controlled to be activated a time or times, upon sensing that an ambient environmental condition has reached a setpoint (such as temperature or humidity), or by receipt of an external communication signal (such from a phone line or Internet input). Each configurable output permits the user to select from such pre-programmed outputs (such as for heating, cooling, humidification or de-humidification stages) or for programmed outputs (such as for lights, security, or other such equipment, whether or not related to environmental control).

The present invention also comprises a jumper display embodiment, where jumper or switch settings in the programmable thermostat are represented in a text or iconic form on the display of the programmable thermostat. This eliminates the need to disconnect or disassemble the housing of the programmable thermostat only to check the status of the jumpers.

The present invention also comprises a humidity sensor retrofit embodiment, where a humidity sensor is easily installed post-purchase and whose input of ambient humidity to the thermostat processor can be used to control a humidification or de-humidification stage added via the configurable outputs. The post-purchase installation reduces the purchase price of a more basic programmable thermostat.

The present invention also comprises a programmable dry contact embodiment where the dry contact may be configured to put a programmable thermostat into energy savings mode, or when connected to a floating liquid level detection switch in the condensate pan, it may be configured to terminate operation of air conditioning and cause a display on the display showing the warning phrase (or its equivalent) "Service Drain Pan". This may prevent water damage to property by ending air conditioning operation and the further buildup of condensate in or around the air conditioning coil.

The present invention also comprises a simple operation embodiment, where the contents of the display of the programmable thermostat are reduced to a simplified version of a more extensive information set. The programmable thermostat may be caused to operate as incapable of responding to programming inputs via the local user interface. In this instance, a reduced information set, such as ambient temperature, mode and setpoint, is shown. The benefits of this embodiment include a high-end feature set with a simple user interface.

The present invention also comprises a high/low temperature display embodiment, where the day's highest and lowest ambient and/or outdoor temperatures detected by the programmable thermostat and stored for display on the thermostat display screen.

The present invention also comprises a programmable security level embodiment, where the thermostat control program is programmed to operate under one or more restrictions that may not be freely removed. In one form of this embodiment, setpoints may not be increased or reduced beyond a pre-set limit, thereby limiting operation of the environmental control equipment. In another form, additional restrictions may be added, such as setpoint limitations and requiring that an unauthorized user be allowed access to only some of several programming modes.

The present invention also comprises a remote sensor display embodiment, where a presentation of current sensed temperatures from two or more temperature sensors are shown to enable trouble shooting of temperature averaging control of the programmable thermostat.

BRIEF DESCRIPTION OF THE DRAWINGS

FIG. 5 is a rear view of the programmable thermostat of FIG. 1 with a rear housing removed and showing a circuit board supporting, among other aspects, configurable outputs and their associated jumpers, contacts for a retrofit wireless communications device supported on a backplate, a removable humidity sensor, and a connector for a communications module or a programming module.

FIG. 6 is a close up view of the jumpers for the configurable outputs shown in FIG. 5.

FIG. 7 is a bottom view of the connected front and rear housings of the thermostat of FIG. 1 showing the opening for and the female portion of an RJ11 jack for receiving connection with the communications module or the programming module.

FIG. 8 is an inside view of a rear housing of the thermostat of FIG. 1 where a wireless communications module is secured within an impression into an inside surface of the rear housing presenting contacts for electrical connection with mating contacts on the circuit board shown in FIG. 5.

FIG. 13 is a front view of a form of a programming module.

FIG. 14 is a block diagram of the programming module of FIG. 13.

DETAILED DESCRIPTION OF THE INVENTION

The invention is now discussed with reference to the figures.

Figure 1:
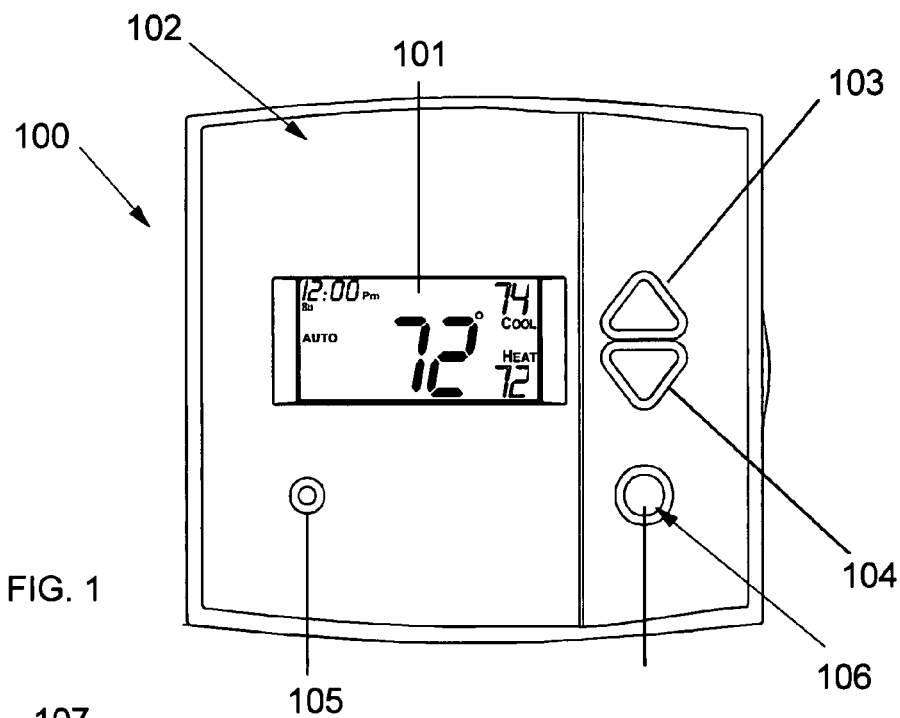
FIG. 1 is a front view of an invention programmable thermostat with a door covering a main front housing.
Figure 2:
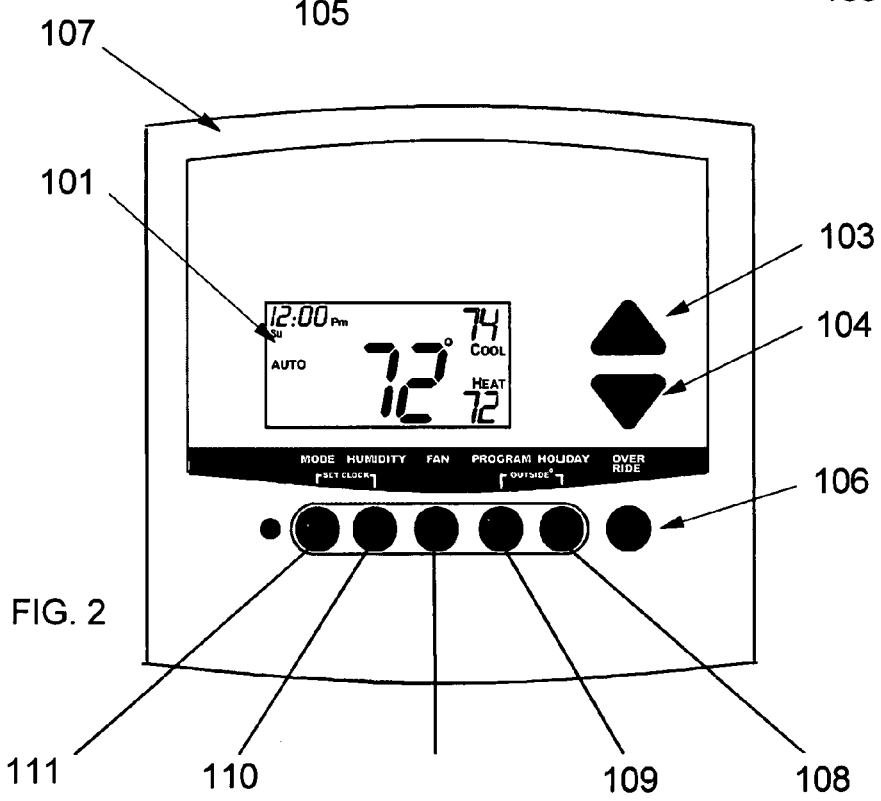
FIG. 2 is a front view of an invention programmable thermostat with a door removed to expose a main front housing.

With reference to FIGS. 1 and 2, the programmable thermostat 100 of the invention comprises a door 102 covering a main front housing 107, both having an opening for presentation of a liquid crystal display 101 on which are shown representations of text and graphic images for a user's interface with the programmable thermostat 100. A number of pressure sensitive buttons comprise a further portion of said user interface. A "warmer" or "up" button 103 is translucent and has positioned behind it a red LED so that said LED is on, off or flashing according to a pre-programmed indication to a user of an operation or status of the programmable thermostat 100. A "cooler" or "down" button 103 is translucent and has positioned behind it a blue LED so that said LED is on, off or flashing according to a pre-programmed indication to a user of an operation or status of the programmable thermostat 100. Buttons 106, 108, 109, 110 and 111 are respectively "holiday", "program", "fan", "humidity" and "mode" buttons, where depressing buttons 108 and 109 together produce an "outside temperature" input and depressing buttons 110 and 111 produce a "set clock" input. Bi-color LED 105 is adapted to appear as green when the programmable thermostat operates in the cooling mode and to appear red when operating in the heating mode.

Figure 3:
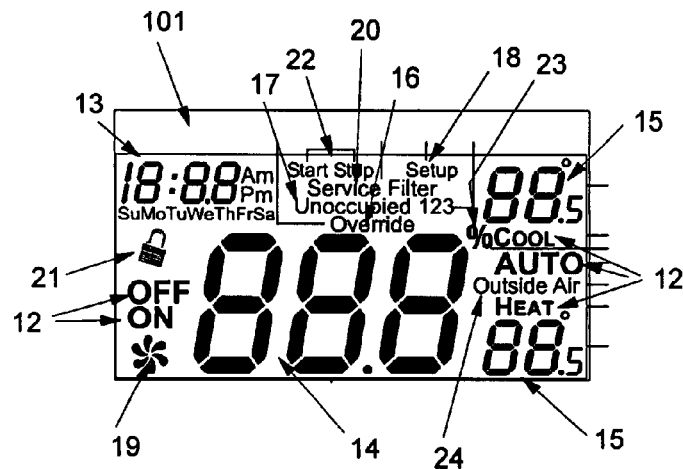
FIG. 3 is a pictorial representation of one form of information capable of being shown on a liquid crystal display in the invention programmable thermostat.

FIG. 3 is an exemplary pictorial of a liquid crystal display 101 of a controlled programmable thermostat 100 (as in FIG. 1), which houses a microprocessor comprising a clock, memory, and CPU, the CPU being connected to an input/output unit that includes user push buttons and said liquid crystal display 111 facilitating operation of a thermostat control program. The pictorial of FIG. 3 shows that the thermostat control program is capable of operating to receive sensor inputs and thereafter displaying the following:

Equipment Operation Mode Indicators 12:
HEAT—indicates the heat mode of HVAC equipment controlled.
COOL—indicates the air conditioning mode of HVAC equipment controlled.
AUTO—indicates the system will automatically changeover between heat and cool modes for HVAC equipment controlled as the temperature varies.
OFF/ON—indicates the entire HVAC equipment system is turned off or is turned on.
Clock with Day of the Week 13: Indicates the current time and day. This clock is also used to program the time periods.
Room Temperature Display 14: Indicates the current room temperature.
Desired Set Temperature 15: Indicates desired room temperature(s).
Override Indication 16: Indicates the current program is currently being overridden for up to 4 hours.
Occupied or Unoccupied Indication 17 indicates the program number: Occupied 1, 2, 3 or Unoccupied.
Setup Indication 18: Indicates the thermostat is in the programming mode.
Fan Operation Indication 19: The fan icon indicates constant, continuous fan operation. When the fan icon is not lit, it indicates the fan will only operate when necessary to heat or to cool.
Service Filter Indication 20: Service Filter indicates when the filter should be serviced under normal conditions.
Locked Indication 21: A lock icon appears after programming steps restrict access to programming levels or set limitations on operation of the programmable thermostat.
Start/Stop Indication 22: Start or Stop appears when programming timer functions.
Percent and Degree Indication 23: "%" appears when air mixture, indoor humidity, or outdoor humidity is being displayed. Appears when temperature is being displayed.
Outside Air or Outside Indication 24: Outside Air or outside appears when Air Mixture, Outdoor Air Temperature, or outside Humidity is being displayed.

It will be apparent to the skilled person that the above disclosure is not limiting in attributing input signals to pressing buttons described in the user interface to effect changes in displayed text or graphic devices or to provide programming input to the programmable thermostat. The objects of the invention may be obtained by re-assigning such inputs to other buttons or buttons added to the user interface.

Figure 4:
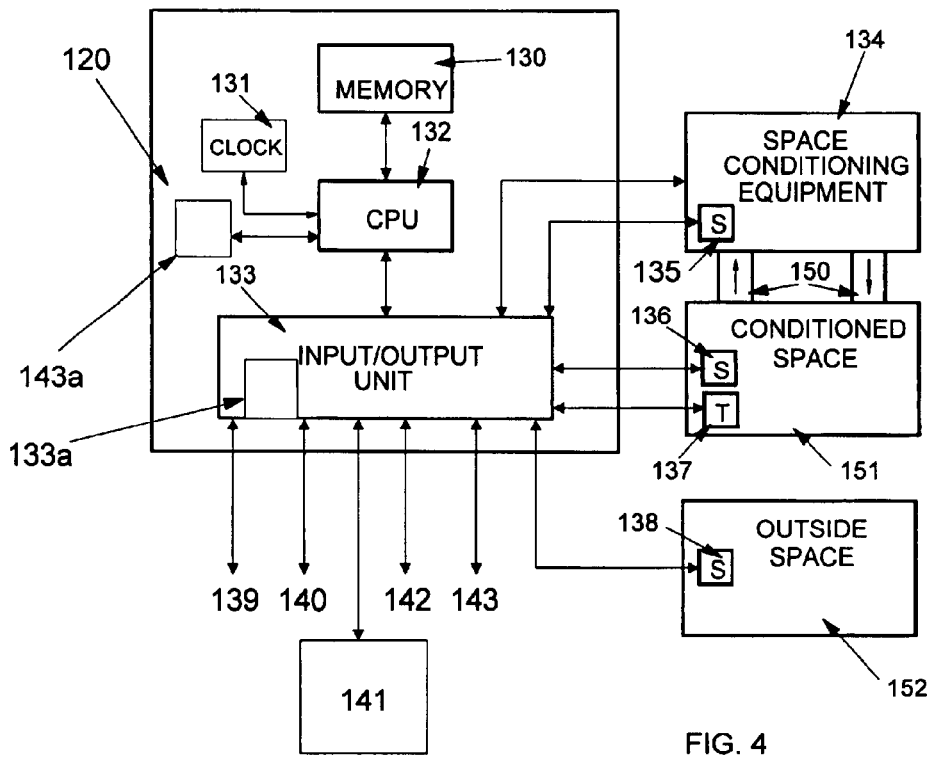
FIG. 4 is block diagram of the invention programmable thermostat.

FIG. 4 shows a block diagram of the programmable thermostat. Processor 120 includes a central processing unit 132 communicating with a memory 130 for storing data and thermostat control program information and also, via an input/output unit (I/O unit) 133, multiple pressure sensitive buttons (as for buttons 103, 104, 106, 108-111 in FIG. 2) constituting a button interface 139 and a liquid crystal display (LCD) 140 (as in display 101 of FIG. 1). Memory 130 can include a read-only part (which may include factory-programmed information) and a random-access part which stores data subject to change. A settable real time clock 131 is used to keep time in the processor 120. An analog-to-digital converter 133a (which may not be required in all systems) serves to convert any analog information received by the I/O unit 133 to digital information which is suitable for use by the CPU 132. The invention thermostat is powered by a battery (not shown) and/or by other means. Temperature, humidity and/or equipment status information is transmitted from the sensors 135 to 138 to the processor 120 through the I/O unit 133. Processor 120 transmits through I/O unit 133 control outputs to environmental control equipment 134, for control of ambient heating, cooling, humidification or de-humidification. Equipment 134 operates in most instances to circulate room air from conditioned space 151 through ducts 150 to change ambient conditions in space 151. Sensor 138 can sense environmental conditions of outside space 152 and transmit signals indicative of those conditions to the processor 120.

Intuitive Algorithm Embodiment

The intuitive algorithm embodiment is described with reference to FIG. 14. A programmable thermostat as described in FIG. 4 operates under control of a control program incorporating the intuitive algorithm of FIG. 14. The intuitive algorithm allows a user to change the modes and setpoints of a programmable thermostat without need to refer to a display of currently effective operational modes, setpoints, or environmental sensor inputs. The intuitive algorithm comprises one or more steps.

FIG. 14 shows three steps of the intuitive algorithm expanded to multiple steps for a clearer understanding thereof. Step 200 initiates the intuitive algorithm within the control program, whereafter in step 212 it is determined whether a "higher" signal has been received by the processor of the programmable thermostat. If a "higher" signal has not been received, step 240 inquires whether a "lower" signal has been received by the processor of the programmable thermostat. If a "lower" signal has not been received, the control program restarts the intuitive algorithm.

If in step 212, a "higher" signal has been received, the thermostat control program in step 214 causes the environmental control equipment (controlled by the thermostat) to be operated under an operational mode associated with receipt of the "higher" signal. In a preferred embodiment, the "higher" signal would be associated with an operational mode for heating a conditioned space with fans, furnaces, heat pumps, or other heating equipment. In step 216, a setpoint for the "higher" mode is changed so that it is preferably changed to a value of the ambient condition to be controlled plus the deadband pre-set by the control program for such mode of operation. In the preferred form for heating a conditioned space, a setpoint in step 216, for example, could be set from a sensed room temperature of 73 degrees F. plus a deadband of 2 degrees F. for a heating setpoint of 75 degrees F.

The environmental control system is operated by the thermostat under the intuitive algorithm in step 218 to increase the temperature of the conditioned space. At steps 220, 226 and 232, if a "lower" signal is received, the setpoint for the "higher" mode is returned to its ambient value in step 238 and the algorithm is returned to step 212.

Receipt of a "higher" signal at step 222 causes the setpoint for the "higher" mode to be changed in step 224 by an increment away from the measured ambient condition. In the present specific example, the setpoint would change from 75 degrees F. to 77 degrees F. if the increment were pre-set to 2 degrees F. If the total number of "higher" signals exceeds a pre-set number (X times in step 228), additional inputs of "higher" signals will not result in any change to the setpoint. When a lockout criteria in step 234 is satisfied (such as one or more minutes of delay, input of security authorization, temperature limits in the specific example, etc.), the algorithm may be re-started as in step 236 or a user may input additional "higher" signals to increase by increments the setpoint.

A "lower" signal may have been detected at step 240, activating the "lower" portion of the algorithm in step 242. The "lower" portion of the algorithm is equivalent to steps 212 to 238 with substitution of "lower" for "higher" and vice versa.

The intuitive algorithm allows a user to input a "higher" or "lower" signal (a first step) and cause the environmental control system to operate in, albeit at a setpoint operationally closest to an ambient environmental condition. The user can then input subsequent single signal inputs identical to the one in the first step (at a second and subsequent steps) to change the setpoint to a value incrementally farther from the ambient condition. In the final step, the user inputs a single signal different from the one in the first step to return the setpoint to the value of the ambient environmental condition. In a re-set step, a user may exit the intuitive algorithm and return the control program to a pre-selected operation mode.

Communication Module Embodiment

Figure 10:
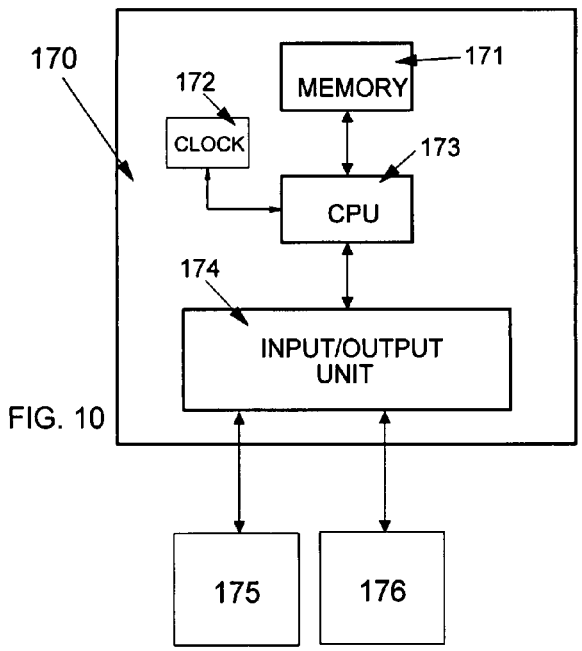
FIG. 10 is a block diagram of the communications module of FIG. 9.
Figure 9:
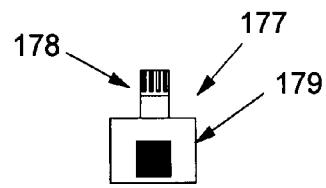
FIG. 9 is a front view of a form of a communications module.

The communication module embodiment shown in FIG. 9 comprises an infrared or otherwise wireless communication module 177 having a male portion of an RJ11 port 178 rigidly connected with a housing 179 containing means corresponding to the block diagram of FIG. 10.

FIG. 10 shows a block diagram of the communication module. Processor 170 includes a central processing unit 173 communicating with a memory 171 for storing data and communication control program information and also, via an input/output unit (I/O unit) 174, wireless signal input via receiver 175 and bi-direction communication with the programmable thermostat via connection 176 (corresponding to port 178 in FIG. 9). Memory 170 preferably includes a read-only part with factory-programmed information allowing the communication module to identify a specific model of programmable thermostat and its communications protocols. A random-access part memory stores data subject to change. A settable real time clock 172 is used to keep time in the processor 120. The invention thermostat is powered by its connection to the programmable thermostat. Wireless signals, preferably infrared, are received by receiver 175 and stored before transmitting signals compatible with a connected programmable thermostat to said thermostat via connection 176.

It is intended that the communications module of FIG. 9 be capable of being fixed by port 178 to a secure electrical connection with a programmable thermostat. FIGS. 5 and 7 show a female portion of port 118 with its opening available through opening 117 in the front housing 107 and rear housing 163. The connection 176 of FIG. 10 is connected with processor 120 of FIG. 5 at connection 142. The invention communication module provides a small add-on to an existing lower cost thermostat enabling temporary or permanent wireless communication between external devices and the invention programmable thermostat.

Remote Communicator Embodiment

Figure 11:
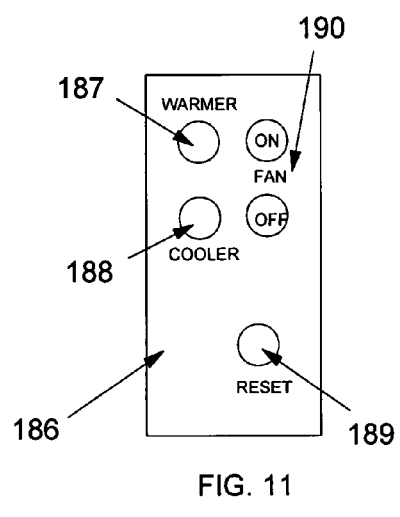
FIG. 11 is a front view of a form of a handheld communicator.
Figure 15:
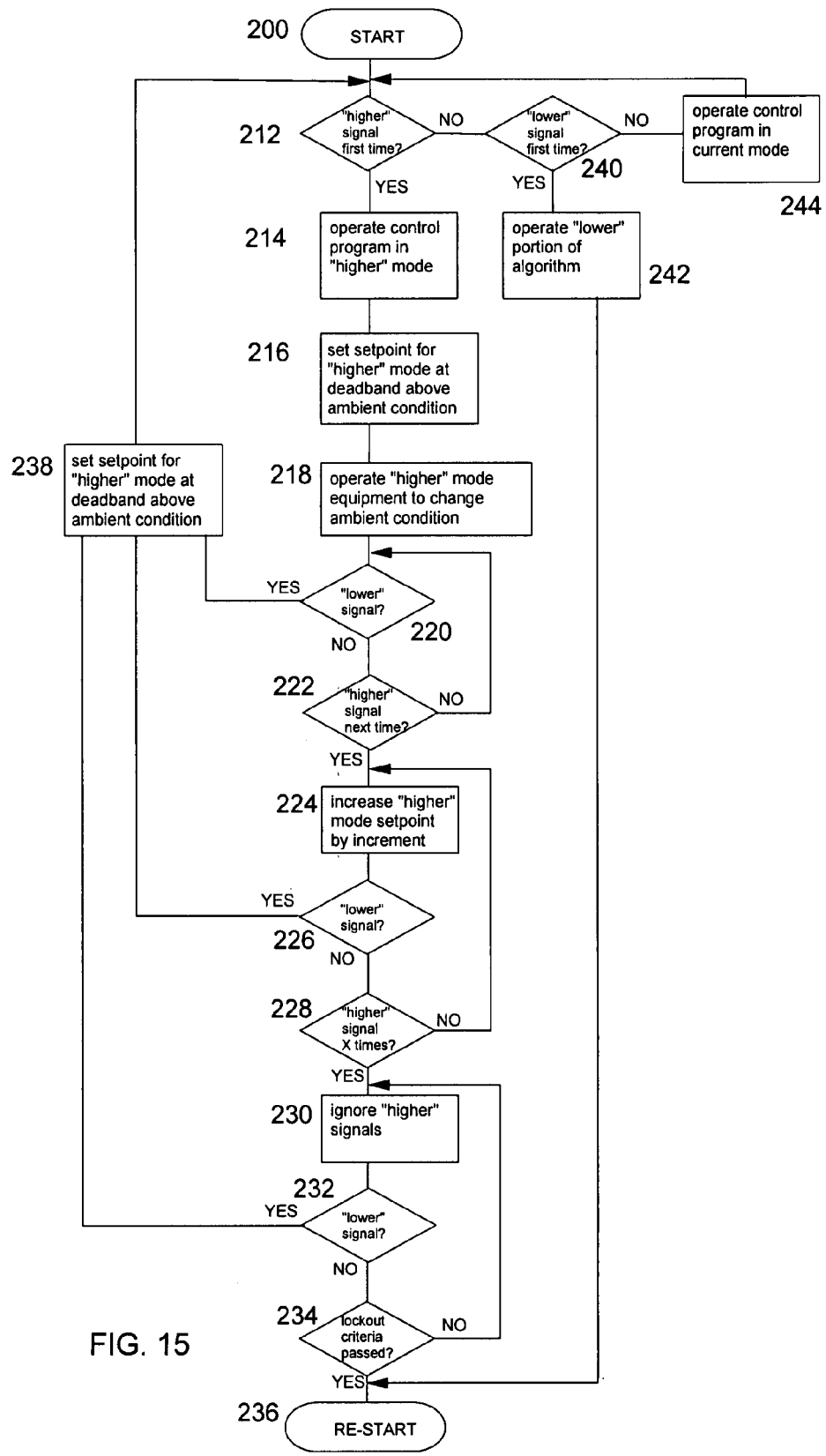
FIG. 15 is a high level flow chart of the intuitive algorithm operating as a portion of a thermostat control program.

The remote communicator embodiment is now discussed with reference to FIGS. 11 and 12. The remote communicator is a small, battery powered, handheld device in a housing 186 with pressure sensitive buttons 187 to 190 on an outside surface. Wireless communications means cause signals resulting from pressing one of the buttons 187 to 190 to send a wireless signal, preferably received by the above communications module effectively connected with a programmable thermostat. Button 187 is labeled "warmer" and a "higher" signal of the intuitive algorithm results from its be pressed. Button 188 is labeled "cooler" and a "lower" signal of the intuitive algorithm results from its be pressed. Button 189 is labeled "reset" and a "re-set" signal of the intuitive algorithm results from its be pressed. Buttons 190 are labeled "on" and "off" for a "fan" and a fan on or off signal results from their be pressed. The communicator device in FIG. 11 lacks a display or other means for showing setpoints, modes, or environmental conditions that a user would typically deem necessary to operation of a thermostat in an environmental control system.

Figure 12:
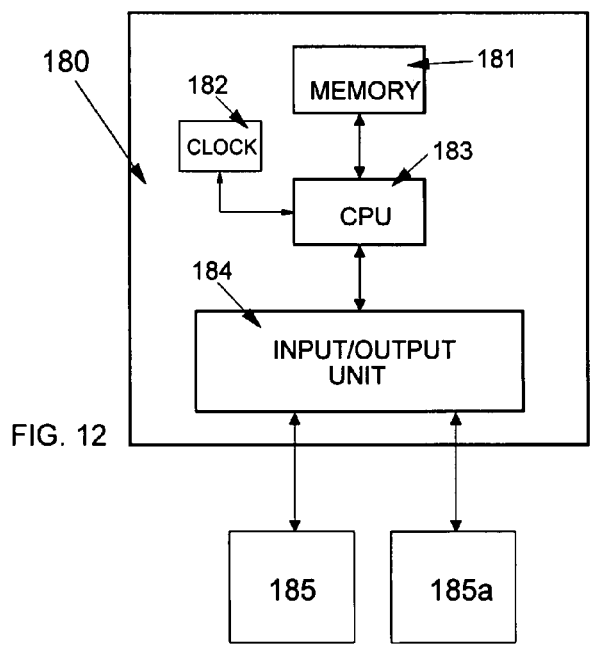
FIG. 12 is a block diagram of the communicator of FIG. 11.

FIG. 12 shows a block diagram of the remote communicator. Processor 180 includes a central processing unit 183 communicating with a memory 181 for storing data and communicator control program information and also, via an input/output unit (I/O unit) 184, wireless signal transmitter 185 for transmissions to be received by the communicator module and for user interface 185a comprising buttons 187 to 190 of FIG. 11. Referring again to FIG. 12, wireless signals, preferably infrared, are transmitted by transmitter 185 in response to signals generated by a user pressing buttons 187 to 190 as shown in FIG. 11 by receiver 175 and stored before transmitting signals compatible with a connected programmable thermostat to said thermostat via connection 176.

Programming Module Embodiment

The programming module embodiment comprises a programming module with a physical and electrical connection to the programmable thermostat similar to that of the communications module. In this case, bi-direction communications are established between the programming module and the programmable thermostat for exchange of setpoints and operation mode information. The programming module, as shown in FIG. 13, is a device with a simple user interface comprising four buttons 50 to 53 supported on the surface of a housing 56. A male end of an RJ11 jack is extended from housing 56 via wires 55. The flexible connection using wires 55 allows a user to easily incline the programming module to an angle that will make pressing buttons 50 to 53 relatively easy.

FIG. 14 shows a block diagram of the programming module. Processor 191 includes a central processing unit 194 communicating with a memory 192 for storing data and programming control program information and also, via an input/output unit (I/O unit) 195, wired connection 196 (corresponding to wires 55 and jack 54 of FIG. 13 which correspond with connection 143 of FIG. 5 for connection with the programmable thermostat) for bi-direction communication with the programmable thermostat and for user interface 196a comprising buttons 50 to 53 of FIG. 13. Referring again to FIG. 14, signals are transmitted by processor 194 in response to signals generated by a user pressing buttons 50 to 53 as shown in FIG. 13.

Memory 192 comprises a read-only part pre-programmed at the factory that includes mode operation and setpoint information (such as time periods for heating or cooling, heating or cooling setpoints, and similar information) identified with specific models of one or more models of the programmable thermostat. Different models of the programmable thermostat will be capable of operating more or fewer pieces of environmental control equipment or are capable or receiving more or fewer inputs of environmental sensors, for example. Not all models of a manufacturer have the same capabilities in order to provide a range of purchase prices. The pre-programmed information in the memory 192 includes information which can be compared with information received from a thermostat so that its model can be identified.

When the programming module is connected by jack 54 in FIG. 13 to port 118 of FIG. 5, the programming control program downloads identification information from the programmable thermostat and determines its model and factory default information associated with it. If button 50, labeled "upload all", is pressed at this time, all the factory default settings information will be transmitted to the programmable thermostat and shall overwrite all other settings in the memory of the programmable thermostat.

If button 51, labeled "periods", is pressed at this time, all the factory default settings information for operation modes will be transmitted to the programmable thermostat and shall overwrite all other operation mode settings in the memory of the programmable thermostat. If button 53, labeled "settings", is pressed at this time, all the factory default settings information for setpoints will be transmitted to the programmable thermostat and shall overwrite all other setpoints in the memory of the programmable thermostat.

If button 53, labeled "download all", is pressed at this time, all the programmable thermostat settings information for operation modes and setpoints will be transmitted to the memory 192 of the programming module and shall be available for uploading in a manner just described for the factory default information.

The programming module is preferably disconnected from the programmable thermostat and re-connected with another programmable thermostat. Or the disconnected programming module may be stored until a user wishes to re-set the programmable thermostat with the downloaded information.

If button 50 is pressed after downloading a thermostat information, all the operation mode and setpoints information previously downloaded will be transmitted to the programmable thermostat and shall overwrite all other settings in the memory of the programmable thermostat. If button 51 is pressed after downloading a thermostat information, all the operation mode information previously downloaded will be transmitted to the programmable thermostat and shall overwrite all other settings in the memory of the programmable thermostat. If button 52 is pressed after downloading a thermostat information, all the setpoints information previously downloaded will be transmitted to the programmable thermostat and shall overwrite all other settings in the memory of the programmable thermostat. A reset button, not shown, is part of the user interface of the programming module and erases all downloaded information so that only factory default information is available for uploading to a thermostat.

Retrofit Embodiment

The retrofit embodiment comprises a more basic model of a programmable thermostat made capable of wireless communications by replacing a rear housing 163 as shown in FIG. 8. The rear housing 163 encloses the programmable thermostat by connection with the front housing 107 (of FIG. 5) and is removable from front housing 107 for access to an underlying of circuit board 112 (of FIG. 5). On the rear-facing surface of circuit board 112 are a set of electrical contacts 115 establishing an electrical connection 143 in the block diagram of the programmable thermostat of FIG. 4. Referring again to FIG. 8, a backplate 166 defines an impression 167 supporting a wireless communication device 168 and presenting electrical contacts 169. Contacts 169 of FIG. 8 make effective electrical contact with contacts 115 when rear housing 163 is re-connected with front housing 107, thereby upgrading the programmable thermostat from a device which had no wireless communication device 168 incorporated into its rear housing. This retrofit embodiment allows a user to purchase a relatively low cost programmable thermostat with a rear housing without any added devices and add to it a wireless communication device 168 just by changing the rear housing 163. In one form of the retrofit embodiment, the wireless module comprises a bi-directional spread spectrum transceiver capable of sending and receiving wireless signals throughout a local area.

Configurable Output Embodiment

The configurable output embodiment comprises one or more configurable outputs for control of environmental control equipment or other devices by way of the programmable thermostat of FIG. 4 through connection of one set of paired electrical connections 143a connected to CPU 132. Each of the jumper sets at location 119 in FIG. 5 represents a separate connection 143a as shown and described for FIG. 4. FIG. 6 shows these three jumper sets 160, 161 and 162, although a single electrical connection of one or the paired sets of electrical connections in each set corresponds to respectively to configuration of the outputs MISC3 (outputs 114 of FIG. 5), MISC2 (outputs 113 of FIG. 5), and MISC1 (outputs 114 of FIG. 5). FIG. 6 shows that a jumper makes electrical connection for jumper set 160 at a line designated as "HUM", which stands for humidifier. Therefore, MISC3 is automatically configured by the thermostat control program to operate its output at outputs 114 for connection to a humidifier.

FIG. 6 shows that a jumper makes electrical connection for jumper set 161 at a line designated as "DEHUM", which stands for de-humidifier. Therefore, MISC2 is automatically configured by the thermostat control program to operate its output at outputs 113 for connection to a de-humidifier.

FIG. 6 shows that a jumper makes electrical connection for jumper set 162 at a line designated as "PROG", which stands for programmable output. Therefore, MISC1 is automatically configured by the thermostat control program to operate its output at outputs 114 for connection to a device which can be controlled by.

Each of the paired sets of electrical contacts, such as set 162 of FIG. 6, represents instructions in the thermostat control program which causes one of the configurable outputs MISC1 to respond according pre-programmed steps and programmable steps. The equipment or device connected to receive output MISC1 may be any device that is desired to be controlled by parameters permitted by the thermostat control program. The programmable output device for output MISC1 may, in preferred forms of the embodiment, be controlled to be activated a time or times, upon sensing that an ambient environmental condition has reached a setpoint (such as temperature or humidity), or by receipt of an external communication signal (such from a phone line or Internet input).

This jumper setting of set 162 of FIG. 6 allows the MISC1 output to control a pilot relay by time, temperature, or a signal from the Internet/phone. The following are three specific examples of such control by the programmable thermostat:

Control by time: A device requiring a start and stop time. An example of this would be an exterior lighting system receiving output MISC1 that needed to be energized every day between the hours of 8:00 p.m. and 1:00 a.m. and turned off otherwise.

Control by temperature: An device, such as an exhaust fan, that is needed for environmental control for health or other reasons energizes whenever the temperature from a specific temperature sensor (such as one of several providing input to the programmable thermostat) rises above 90 degrees F.

Control by remote activation: The I/O unit 133 may receive remote signals, voice, digital or otherwise, that result in an energizing output to arm a security system.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

The invention claimed is:

1. A system of a wirelessly programmable thermostat and a wireless programming module having a minimized user interface comprising:

(a) the programmable thermostat comprising a first microprocessor effectively connected with a first input/output unit which in turn connects the first microprocessor to an environmental sensor, environmental control equipment for controlling environmental conditions of a conditioned space, a user-visible display screen, a user input interface, and a first wireless communication module, where a first control program operable by the thermostat microprocessor thermostat is adapted to compare a sensed environmental condition of the environmental sensor, compare it to a pre-determined setpoint, and to operate the environmental control equipment if the sensed environmental condition is outside of a range determined by said setpoint;

(b) the wireless programming module having a portable housing with pressure sensitive buttons presented to a user and comprising a second microprocessor effectively connected with a second input/output unit and a second wireless communication module, where a second control program operable by the a user detects that a user has pressed one or more of the buttons and thereafter signals are transmitted by way of the second wireless communication module to the first communication module and the first control program causes a change in said setpoint or other thermostat function for control of environmental control equipment;

(c) the wireless programming module lacks visible indications or displays observable to a user that any button has been pressed.

2. The system of claim 1 wherein the first wireless communication module is removable.

3. The system of claim 1 wherein one of the pressure sensitive buttons is a heating button and is closely associated with a text or graphic device indicating that pressing it will decrease a heating setpoint in the thermostat by a predetermined increase amount.

4. The system of claim 3 wherein a user pressing the heating button causes the second control program to wirelessly transmit signals to the thermostat, whereupon a heating setpoint is increased by a predetermined increase amount.

5. The system of claim 4 wherein the first user interface comprises means for inputting to the microprocessor a determination of the increase amount.

6. The system of claim 1 wherein one of the pressure sensitive buttons is a cooling button and is closely associated with a text or graphic device indicating that pressing it will increase a heating setpoint in the thermostat by a predetermined decrease amount.

7. The system of claim 6 wherein a user pressing the cooling button causes the second control program to wirelessly transmit signals to the thermostat, whereupon a cooling setpoint is decreased by a predetermined decrease amount.

8. The system of claim 7 wherein the first user interface comprises means for inputting to the microprocessor a determination of the decrease amount.

9. The system of claim 1 wherein one of the pressure sensitive buttons is a fan button and is closely associated with a text or graphic device indicating that pressing it will turn a fan of the environmental control equipment on.

10. The system of claim 9 wherein a user pressing the fan button causes the second control program to wirelessly transmit signals to the thermostat, whereupon the fan is turned on.

11. The system of claim 1 wherein one of the pressure sensitive buttons is a reset button and is closely associated with a text or graphic device indicating that pressing it will reset heating or cooling setpoints to predetermined default values.

12. The system of claim 11 wherein a user pressing the reset button causes the second control program to wirelessly transmit signals to the thermostat, whereupon a heating or cooling setpoints are reset to predetermined default values.

13. The system of claim 12 wherein the first user interface comprises means for inputting to the microprocessor a determination of the default values.

* * * * *